(12) United States Patent
Weinfield

(10) Patent No.: US 10,491,405 B2
(45) Date of Patent: Nov. 26, 2019

(54) CRYPTOGRAPHIC SECURITY VERIFICATION OF INCOMING MESSAGES

(71) Applicants: DENSO International America, Inc., Southfield, MI (US); DENSO CORPORATION, Kariya, Aichi-pref. (JP)

(72) Inventor: Aaron D. Weinfield, Encinitas, CA (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 384 days.

(21) Appl. No.: 15/284,573

(22) Filed: Oct. 4, 2016

(65) Prior Publication Data
US 2018/0097637 A1 Apr. 5, 2018

(51) Int. Cl.
| | | |
|---|---|---|
| *H04W 4/12* | (2009.01) | |
| *H04L 9/32* | (2006.01) | |
| *H04L 29/06* | (2006.01) | |
| *H04B 17/318* | (2015.01) | |
| *H04W 4/44* | (2018.01) | |
| *H04B 17/27* | (2015.01) | |

(52) U.S. Cl.
CPC ........... *H04L 9/3263* (2013.01); *H04B 17/27* (2015.01); *H04B 17/318* (2015.01); *H04L 63/0823* (2013.01); *H04L 63/123* (2013.01); *H04W 4/12* (2013.01); *H04W 4/44* (2018.02); *G06F 2221/2111* (2013.01); *G06F 2221/2151* (2013.01); *H04L 2209/84* (2013.01)

(58) Field of Classification Search
CPC .............................. H04L 9/3263; H04W 4/008
USPC .................................................. 713/150–155
See application file for complete search history.

(56) References Cited

U.S. PATENT DOCUMENTS

| | | | | |
|---|---|---|---|---|
| 8,621,269 B2* | 12/2013 | Vas | .................. | H04L 63/06 714/6.2 |
| 9,148,414 B1* | 9/2015 | Roth | .................. | H04L 63/08 |
| 9,661,006 B2* | 5/2017 | Kantor | .................. | H04L 63/1408 |

(Continued)

FOREIGN PATENT DOCUMENTS

WO WO-2015028194 A1 3/2015

*Primary Examiner* — Lynn D Feild
*Assistant Examiner* — Viral S Lakhia
(74) *Attorney, Agent, or Firm* — Harness, Dickey & Pierce, P.L.C.

(57) ABSTRACT

Systems and methods for cryptographic security verification include receiving, using a dedicated short range communications system, a message from a remote vehicle or an infrastructure system. A processor determines whether a current number of attempted message verifications per second is less than a predetermined threshold. The processor performs verification of the message in response to determining that the current number of attempted message verifications per second is less than the threshold. The processor determines whether the message falls within at least one predetermined category of message type and performs verification of the message in response to the current number of attempted message verifications per second not being less than the threshold and the message falling within the at least one predetermined category of message type. The processor processes the message in response to the message being verified.

10 Claims, 6 Drawing Sheets

(56) References Cited

U.S. PATENT DOCUMENTS

| | | | |
|---|---|---|---|
| 9,705,678 B1* | 7/2017 | Wang | G06F 21/575 |
| 9,942,787 B1* | 4/2018 | Tillotson | H04W 24/08 |
| 10,095,578 B2* | 10/2018 | Resch | H04L 67/06 |
| 10,313,225 B1* | 6/2019 | Shevade | H04L 45/14 |
| 2003/0144042 A1* | 7/2003 | Weinfield | H04W 52/0261 |
| | | | 455/574 |
| 2008/0235509 A1 | 9/2008 | Laberteaux et al. | |
| 2009/0254754 A1 | 10/2009 | Bellur et al. | |
| 2010/0049976 A1* | 2/2010 | Karnik | H04L 63/12 |
| | | | 713/168 |
| 2011/0066859 A1 | 3/2011 | Iyer et al. | |
| 2011/0080302 A1 | 4/2011 | Muthaiah et al. | |
| 2011/0140968 A1* | 6/2011 | Bai | G01S 5/0072 |
| | | | 342/454 |
| 2011/0238986 A1 | 9/2011 | Kherani et al. | |
| 2011/0238987 A1 | 9/2011 | Kherani et al. | |
| 2011/0238997 A1 | 9/2011 | Bellur et al. | |
| 2011/0258435 A1 | 10/2011 | Bellur et al. | |
| 2012/0311340 A1 | 12/2012 | Naganuma et al. | |
| 2013/0165146 A1 | 6/2013 | Stahlins et al. | |
| 2014/0002276 A1 | 1/2014 | Iyer et al. | |
| 2014/0006615 A1* | 1/2014 | Karnik | H04L 63/0227 |
| | | | 709/225 |
| 2014/0125498 A1 | 5/2014 | Curry et al. | |
| 2015/0033019 A1 | 1/2015 | Oguma et al. | |
| 2015/0089236 A1* | 3/2015 | Han | H04L 9/3242 |
| | | | 713/181 |
| 2015/0121071 A1* | 4/2015 | Schwarz | H04L 63/12 |
| | | | 713/168 |
| 2015/0138975 A1* | 5/2015 | Gotz | G08G 1/093 |
| | | | 370/235 |
| 2016/0021127 A1* | 1/2016 | Yan | G06F 21/554 |
| | | | 726/23 |
| 2016/0036558 A1* | 2/2016 | Ibrahim | H04L 67/18 |
| | | | 455/297 |
| 2016/0036586 A1 | 2/2016 | Murakami et al. | |
| 2016/0203711 A1* | 7/2016 | Scherping | H04W 4/046 |
| | | | 370/310 |
| 2018/0196941 A1* | 7/2018 | Ruvio | H04L 63/1425 |

* cited by examiner

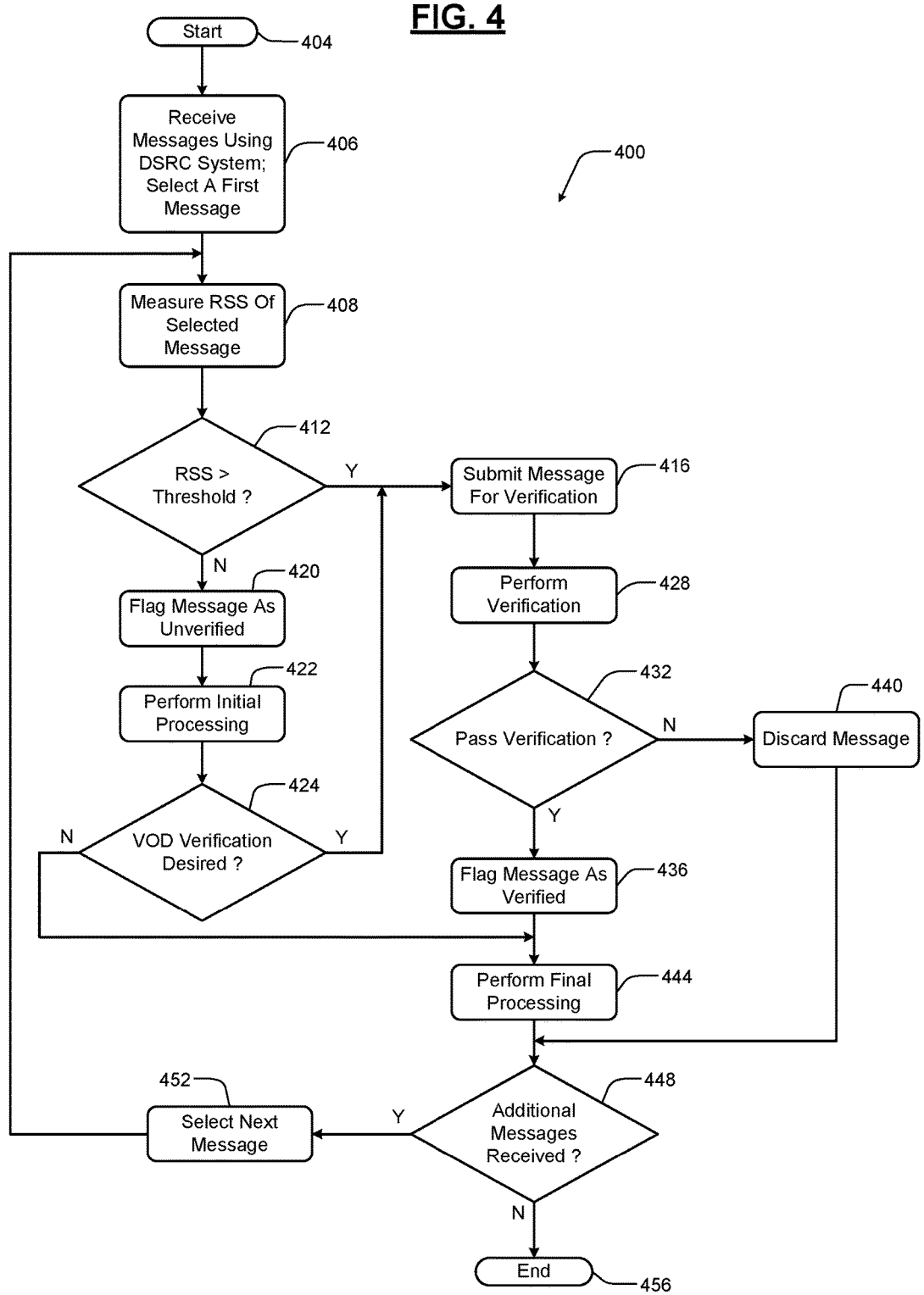

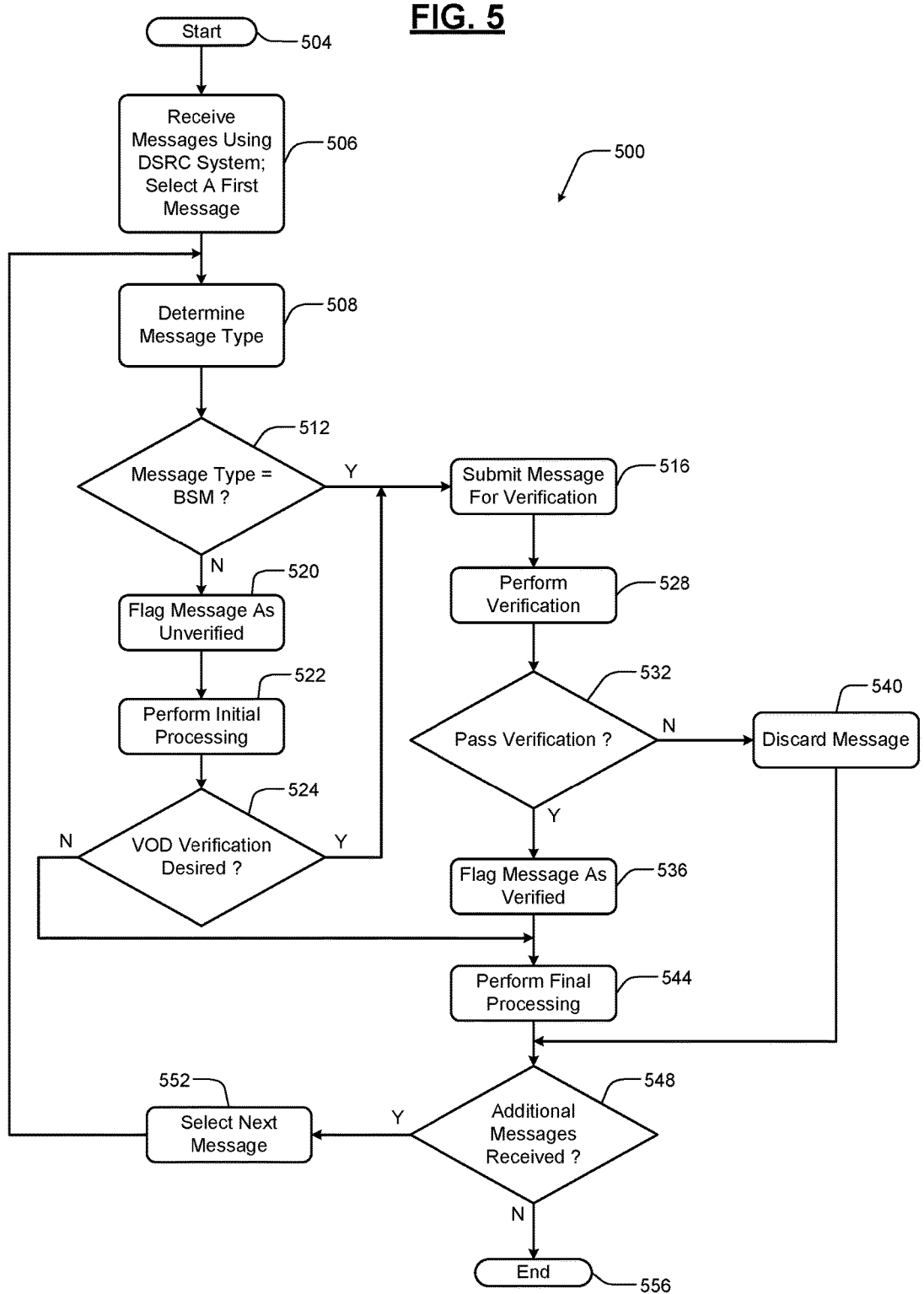

CRYPTOGRAPHIC SECURITY VERIFICATION OF INCOMING MESSAGES

FIELD

The present disclosure relates to cryptographic security verification of incoming messages of a dedicated short range communication system.

BACKGROUND

This section provides background information related to the present disclosure which is not necessarily prior art.

Vehicle-to-vehicle and vehicle-to-infrastructure (collectively referred to as V2X) safety technology relies on a host vehicle receiving messages via a dedicated short range communication (DSRC) system from at least one remote vehicle. Each channel of the DSRC system of the host vehicle may have an incoming message threshold rate, which is the maximum possible number of received messages per second that the DSRC system can process. As an example, the incoming message threshold rate may be 2,500 messages per second. Thus, each channel of the DSRC system may be able to receive up to 2,500 messages per second while communicating with multiple remote vehicles, such as, for example, 1,000 remote vehicles.

However, the ability to perform cryptographic security verification on all received messages when the DSRC system is receiving messages at or near the incoming message threshold rate may not be practical. As such, there is a need for a method and a system for performing cryptographic security verification for incoming messages of a DSRC system.

SUMMARY

This section provides a general summary of the disclosure, and is not a comprehensive disclosure of its full scope or all of its features.

A method of cryptographic security verification is provided and includes receiving, using a dedicated short range communications system (DSRC), a message from at least one of a remote vehicle and an infrastructure system. The method also includes determining, using a processor that is configured to execute instructions stored on a nontransitory memory component, whether a current number of attempted message verifications per second is less than a predetermined threshold. The method also includes performing, using the processor, verification of the message in response to determining that the current number of attempted message verifications per second is less than the threshold. The method also includes determining, using the processor, whether the message falls within at least one predetermined category of message type in response to the current number of attempted message verifications per second not being less than the threshold. The method also includes performing, using the processor, verification of the message in response to the current number of attempted message verifications per second not being less than the threshold and the message falling within the at least one predetermined category of message type. The method also includes processing, using the processor, the message in response to the message being verified.

Another method of cryptographic security verification is provided and includes receiving, using a dedicated short range communications system (DSRC), a message from at least one of a remote vehicle and an infrastructure. The method also includes determining, using a processor that is configured to execute instructions stored on a nontransitory memory component, whether a received signal strength of the message is greater than a threshold received signal strength. The method also includes performing, using the processor, verification of the message in response to determining that the received signal strength of the message is greater than the threshold. The method also includes determining, using the processor, whether the message falls within at least one predetermined category of message type in response to the received signal strength of the message not being greater than the threshold received signal strength. The method also includes performing, using the processor, verification of the message in response to the received signal strength of the message not being greater than the threshold received signal strength and the message falling within the at least one predetermined category of message type. The method also includes processing, using the processor, the message in response to the message being verified.

Another method of cryptographic security verification is provided and includes receiving, using a dedicated short range communications system (DSRC), a message from at least one of a remote vehicle and an infrastructure. The method also includes determining, using a processor that is configured to execute instructions stored on a nontransitory memory component, whether the message falls within a first predetermined category of message type. The method also includes performing, using the processor, verification of the message in response to determining that the message falls within the first predetermined category of message type. The method also includes determining, using the processor, whether the message falls within a second predetermined category of message type in response to the message not falling within the first predetermined category of message type. The method also includes performing, using the processor, verification of the message in response to the message falling within a second predetermined category of message type and not falling within the first predetermined category of message type. The method also includes processing, using the processor, the message in response to the message being verified.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 3-5 are flowcharts showing example implementations of methods for incoming message security verification.

Corresponding reference numerals indicate corresponding parts throughout the several views of the drawings.

DETAILED DESCRIPTION

Example embodiments will now be described more fully with reference to the accompanying drawings.

Figure 1A:
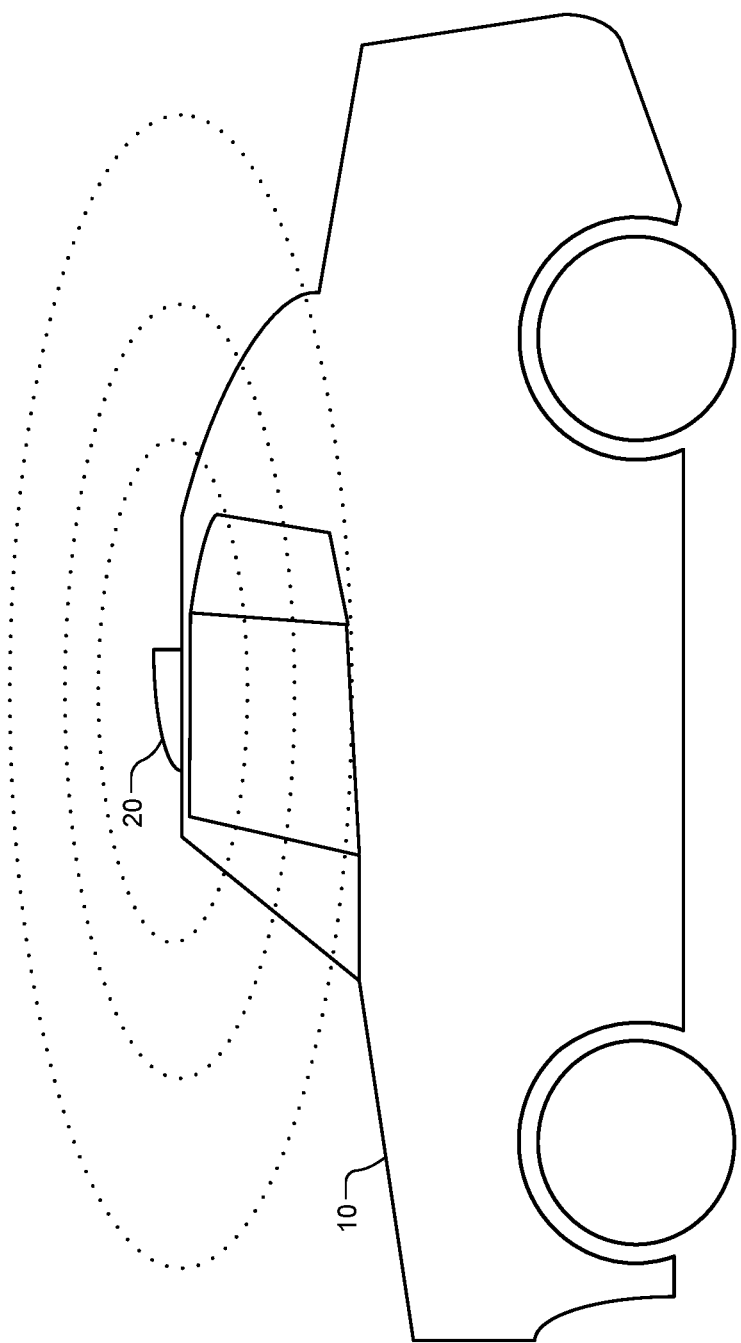
FIGS. 1A-1B are high-level illustrations of vehicles equipped with V2X safety technology.

With reference to FIG. 1A, a vehicle with V2X safety technology is shown. In the example embodiment, a vehicle 10 is equipped with a DSRC system 20. The DSRC system 20 may be configured to transmit and receive signals representing, for example, early warnings of accidents and driving hazards to/from remote vehicles that are also equipped with V2X systems and/or to/from an infrastructure communication location equipped with a V2X system. Additionally, the DSRC system 20 may be configured to predict future accidents and driving hazards based on communication with remote vehicles and/or infrastructure communication locations that are also equipped with V2X systems by calculating the current and future positions of the vehicle 10.

The DSRC system 20 may also be configured to improve a fuel efficiency of the vehicle 10. The DSRC system 20 may be configured to communicate to an operator of the vehicle 10 a timing of a traffic signal, thereby allowing the operator to optimize fuel efficiency and time-saving driving habits. As an example, the DSRC system 20 may be configured to communicate with the traffic signal and alert the operator as to how much time he or she has until the light will change from a red light to a green light, a green light to a yellow light, or a yellow light to a red light. As another example, the DSRC system 20 may instruct the operator to operate the vehicle at a certain speed in order to avoid being stopped by a red light on a traffic route.

The DSRC system 20 may communicate with other vehicles or infrastructure equipped with a V2X system by using a 75 MHz band around a 5.9 GHz signal. An example embodiment of the DSRC system 20 is described below with reference to FIG. 2. All of the components of the DSRC system 20 may be located at one or multiple locations on the roof of the vehicle. Alternatively, some of the components may be located in the interior of the vehicle 10.

Figure 1B:
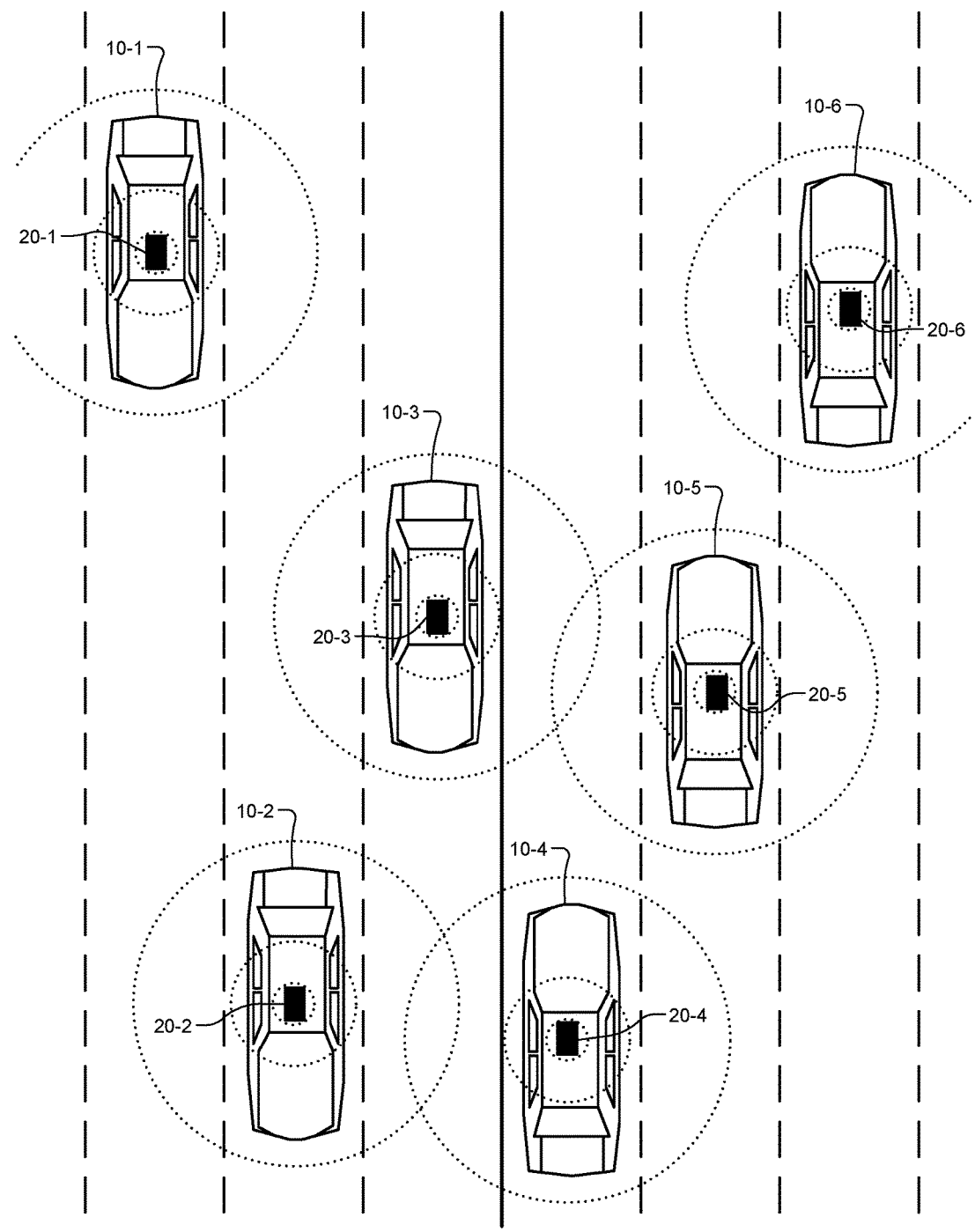

With reference to FIG. 1B, a plurality of vehicles with V2X safety technology is shown. In the example embodiment, vehicles 10-1, 10-2, . . . 10-6 (collectively referred to as vehicles 10) are respectively equipped with DSRC systems 20-1, 20-2, . . . 20-6 (collectively referred to as DSRC systems 20). The DSRC systems 20 may operate in both line-of-sight (LOS) and non-line-of-sight (NLOS) conditions, thereby allowing the DSRC systems 20 of the vehicles 10 to communicate warnings and driving hazards, even with blockage from intervening vehicles, blind corners, or other roadside infrastructure. DSRC signals from each of the DSRC systems 20 are illustrated radiating outward in a circular pattern, as indicated by dotted circles in FIG. 1B.

In some situations, the DSRC signal coverage around the vehicle 10 may be non-circular. Thus, the effective link range between the vehicles 10 may be reduced in certain directions and may ultimately impair the delivery of alerts and warnings. For example, the link range may be degraded or reduced based on the shape of a vehicle body and blockage from the curved roof; the use of metals, nonmetals, and/or glass on the vehicle body; roof blockage, including racks, bags, luggage carriers, etc.; the sizes, locations, and number of antennas; interference from other wireless antenna elements, such as LTE/cellular interference; and weaker coverage below the vehicle's horizon. However, these factors may be mitigated by the implementation of a dual-chain transmit (Tx) and diversity receive (Rx) mode; antenna elements positioned on the glass, headliner, plastic, and/or other surface of the vehicle in addition to antenna elements located on the roof; additional amplifiers in a Tx/Rx signal path; and low-loss radio frequency (RF) cable assemblies that connect antennas to optional amplifiers or to the DSRC radio.

Figure 2:
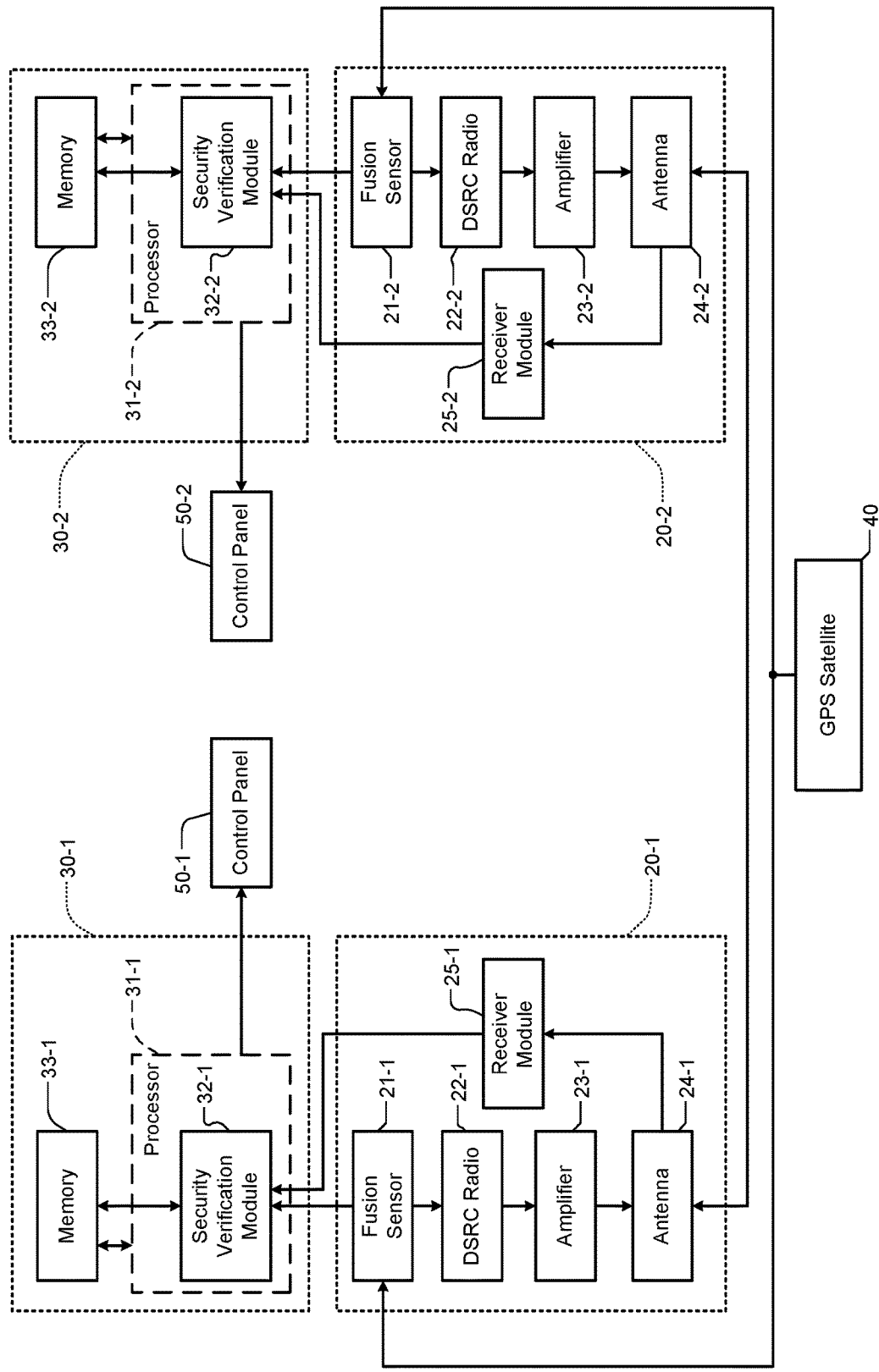
FIG. 2 is a high-level illustration of a security control system and a DSRC system.

With reference to FIG. 2, a high-level illustration of a system including a security control system and a DSRC system is shown. The system includes the DSRC systems 20, which may each further include fusion sensors 21-1, 21-2 (collectively referred to as fusion sensors 21), DSRC radios 22-1, 22-2 (collectively referred to as DSRC radios 22), amplifiers 23-1, 23-2 (collectively referred to as amplifiers 23), antennas 24-1, 24-2 (collectively referred to as antennas 24), and receiver modules 25-1, 25-2 (collectively referred to as receiver modules 25). The system may also include security control systems 30-1, 30-2 (collectively referred to as security control systems 30), which may each further include processors 31-1, 31-2 (collectively referred to as processors 31), security verification modules 32-1, 32-2 (collectively referred to as security verification modules 32), and memories 33-1, 33-2 (collectively referred to as memories 33).

The fusion sensor 21, which may further include a GPS receiver, may receive geospatial location data that includes positioning and time information from a GPS satellite 40. The DSRC radio 22 transmits DSRC radio signals representing the geospatial location data from the fusion sensor 21 through the antenna 24. Additionally or alternatively, the DSRC system 20 may communicate positioning and time information from the GPS satellite 40 via an LTE or other cellular data signal. The amplifier 23, which may be a bidirectional amplifier, may electrically couple the DSRC radio 22 and the antenna 24 via an RF cable. The amplifier 23 may increase the range of the DSRC radio signal generated by the DSRC radio 22 and increase the lower boundary of signal strength detectable by the antenna 24.

In addition to receiving geospatial location data from the satellite 40 and transmitting DSRC radio signals through the antenna 24 corresponding to the geospatial location data, the DSRC system 20 may be configured to receive signals transmitted from remote vehicles and/or infrastructure systems. Accordingly, the receiver module 25 may be configured to receive DSRC radio signals through the antenna 24. The receiver module 25 may comprise an RF filter and an RF amplifier to suppress image frequencies and to prevent saturation of the system. A local oscillator of the receiver module may be configured to provide a mixing frequency to a frequency mixer in order to change the received frequency into a new, intermediate frequency. An intermediate frequency filter and amplifier may be configured to amplify the signal and limit the intermediate frequencies to a certain bandwidth. Subsequently, a demodulator may extract the desired modulation from the filtered intermediate frequency and deliver the extracted modulation, which includes the message from the remote vehicle, to the security control system 30.

The security control system 30, using the security verification module 32, may be configured to perform cryptographic security verification on messages that are received by the DSRC system 20, thereby authenticating that a received message originated from a properly certified remote vehicle and/or infrastructure system and that it was not manipulated on its way between the remote and host vehicle. The security control system 30 may thereby prevent denial of service (DOS), distributed denial of service (DDOS), Sybil, and/or node impersonation attacks of a network in which V2X communications occur. Furthermore, cryptographic security verification may prevent application/forged message, timing, social, monitoring, and replay attacks on the V2X system.

In one embodiment, messages transmitted and received by the DSRC system 20 are verified using digital signatures in accordance with an industry standard specification, which may be the IEEE 1609.2 standard. Using this standard, an application program interface (API) and message format may be used for security features, which may include attaching a digital signature and a security certificate to a message or attaching one of a security certificate digest and a security certificate chain to a message when a hierarchical public key infrastructure (PKI) is used with each message.

As an example, to perform cryptographic security verification on a message, the security control system 30 may have a list of trustworthy security certificates and/or digital signatures that are stored in the memory 33. As such, the security verification module 32 may be configured to compare the security certificate and/or digital signature of the received message to the list of stored trustworthy security certificates and/or digital signatures stored in the memory 33. If the received messages' security certificate and/or digital signature match one of the trustworthy security certificates and/or digital signatures stored in the memory 33, the security control system 30 may be configured to flag the message as verified. Otherwise, the security control system 30 may discard the message and/or flag the message as unverified. Additionally or alternatively, the security control system 30 may be configured to process the unverified message if it is, for example, a message representing non-critical information related to remote vehicles, roads, and/or infrastructures.

The security control system 30, using the security verification module 32, may be configured to employ a variety of cryptographic verification techniques for certifying incoming messages. As an example, the security verification module 32 may be configured to perform a verify-on-demand (VOD) and/or a verify-then-process (VTP) verification on the incoming message.

The VTP verification method performs cryptographic verification on each incoming message as it is received by the security verification module 32 before the processor 31 acts on the message (e.g., the processor 31 may determine a position of a remote vehicle, determine what type of driving hazard is nearby, etc.). If the message passes the cryptographic verification, then the necessary actions are taken on the received message.

The VOD verification method, on the other hand, does not verify incoming messages upon being received by the processor 31. Instead, the incoming messages are decoded and processed as valid messages. If a given incoming message warrants some predetermined action by the processor 31, such as providing a safety warning to the driver, the initially received message is submitted for cryptographic verification before taking the predetermined action, such as providing the safety warning to the driver. If the message passes the cryptographic verification, then the necessary actions are taken on the received message. Otherwise, if the incoming message does not warrant some predetermined action by the processor, the message may be processed without performing cryptographic verification.

The type of verification performed on an incoming message is described below in further detail in FIGS. 3-5. By optimizing the verification process based on a predefined set of criteria, the processor 31 and/or security verification module 32 may be utilized to its full capability. As such, incoming messages that are not critical for vehicle safety may be filtered out and thereby will not be cryptographically verified. Additionally, since the security verification module 32 may not be able to process all incoming messages, additional security verification may be performed on those messages needing verification if they have not been verified upon reception.

The security verification module 32 may be implemented by the processor 31, which is configured to, based on instructions stored in the memory 33 and in response to receiving the demodulated DSRC radio signal from the receiver module 25, perform cryptographic verification of the demodulated DSRC radio signal that includes the message. The memory 33 may be a nontransitory computer readable medium, such as a read-only memory (ROM) and/or random-access memory (RAM) component.

Alternatively, the security verification module 32 may not be implemented by the processor 31 and may be a separate module located within the security control system 30. As an example, the security verification module 32 may be implemented by a second processor of the security control system 30 that is in communication with the memory 33 and the processor 31.

In response to an incoming message passing a cryptographic verification and depending on the type of incoming message, the security control system 30 may be configured to communicate a warning or alert to a control panel 50 of the vehicle corresponding to the incoming message. As an example, in response to receiving a message from the processor 31, the control panel 50 may be configured to provide an alert to the operator of the vehicle corresponding to the signal using a visual alert (i.e., a flashing icon on a dashboard and/or a touchscreen interface), an auditory alert (i.e., a beep or loud audio tone), a haptic alert (i.e., using tapping vibration pulses on a steering wheel or a driver seat to alert the operator of a driving hazard), and/or a control signal for vehicle action, such as a control signal to a braking system, a steering system, and/or a throttle system.

Figure 3:
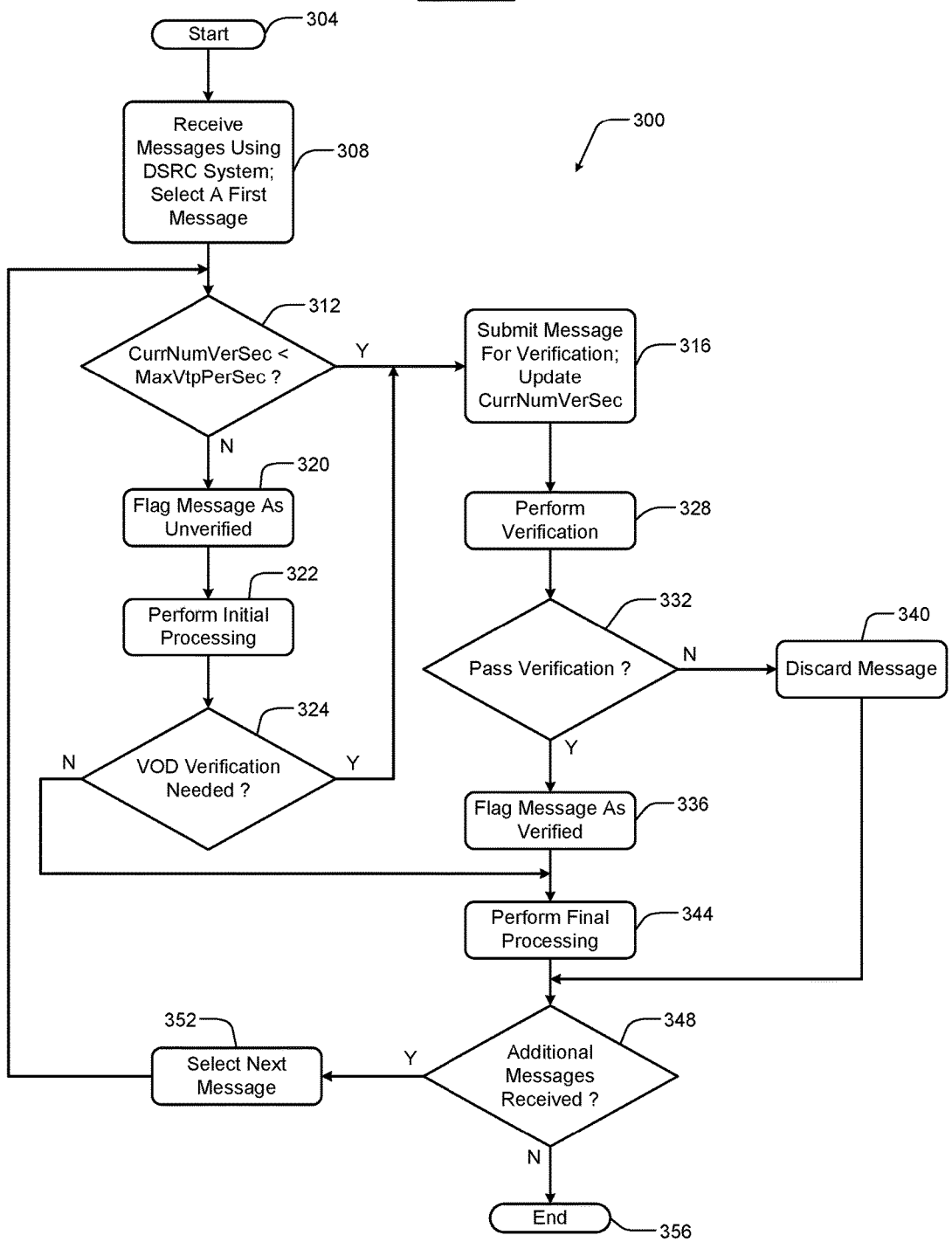

With reference to FIG. 3, a flowchart 300 showing an example implementation of a method for cryptographically verifying an incoming message of a DSRC system is shown. The algorithm begins at 304 when, for example, the vehicle is turned on by the operator. At 308, the DSRC system receives messages from, for example, a remote vehicle or an infrastructure system, and then the security verification module selects a first message. At 312, the algorithm determines whether the current number of attempted message verifications per second (CurrNumVerSec) of the security verification module is less than a threshold message verification limit (MaxVtpPerSec) before being processed. The MaxVtpPerSec may be determined by, for example, the following formula:

$$MaxVtpPerSec=((NumVerPerSec*C)-MaxVodPerSec),$$

wherein the variable NumVerPerSec represents the maximum number of security verifications per second supported by the security verification module (e.g., NumVerPerSec=2,500 messages per second), the variable C is a predetermined constant configured to provide additional head-room so the security verification module is not overloaded (e.g., C=0.8), and the variable MaxVodPerSec represents a predetermined maximum number of messages per second to be verified after being processed (e.g., MaxVodPerSec=10). As an example, messages that are critically important to the safety of the vehicle may be verified after being processed.

Using the above variables and corresponding example values, the algorithm at 312 determines whether the current number of attempted message verifications per second is less than the MaxVtpPerSec (e.g., MaxVtpPerSec=1,990 when the NumVerPerSec=2,500, C=0.8, and MaxVodPerSec=10).

If so, then the algorithm transfers to 316; otherwise, the algorithm transfers to 320. At 316, the algorithm submits the message for verification and updates the current number of attempted message verifications per second. Then, the algorithm transfers to 328.

At 320, in response to the algorithm's determination that the current number of attempted message verifications per second is greater than or equal to the threshold message verification limit, the security verification module may flag the message as unverified. At 322, the algorithm performs initial processing on the message. In other words, the received message is decoded and processed as a valid message. At 324, the algorithm determines whether VOD verification is desired for the message. As an example, VOD verification may be performed on messages that are critically important to the safety of the vehicle, such as messages indicating a driving hazard, accident, cooperative cruise control, and security certificate distribution messages. Additionally, messages that are not critically important to the safety of the vehicle, such as a message from an emergency vehicle traveling in the opposite direction of the vehicle, may not require VOD verification. If VOD verification is desired, the algorithm returns to 316; otherwise, the algorithm proceeds to 344 and processes the message.

Returning to 328, the algorithm performs cryptographic verification of the message. At 332, the algorithm determines whether the message passes the verification. If so, the algorithm transfers to 336; otherwise, in response to the message being, for example, corrupted or subject to malicious tampering, the message is discarded at 340 and then proceeds to 348.

Returning to 336, the message is flagged as verified and then transfers to 344. At 344, the algorithm performs final processing on the signal. At 344, the algorithm may perform further processing on the message or generate an output corresponding to the message, such as an alert, a control signal to a vehicle system, etc. The algorithm then transfers to 348. At 348, the algorithm determines whether there are additional messages that were received by the DSRC system. If so, the algorithm proceeds to 352 and the security verification module selects the next message that was received by the DSRC system. After selecting the next message, the algorithm returns to 312. If the algorithm determines there are not any additional messages that were received by the DSRC system at 348, the algorithm proceeds to 356 and ends.

With reference to FIG. 4, a flowchart 400 showing an example implementation of another method for cryptographically verifying an incoming message of a DSRC system is shown. The algorithm begins at 404 when, for example, the vehicle is turned on by the operator. At 406, the DSRC system receives message from, for example, a remote vehicle or an infrastructure system, and then the security verification module selects a first message.

At 408, the algorithm measures the received signal strength (RSS) of the received message. Using the RSS of the message may allow the processor to determine the relative proximity of the remote vehicle in relation to the host vehicle. Generally, a higher RSS may indicate that the remote vehicle is closer to the host vehicle, while a lower RSS may indicate that the remote vehicle is further away from the host vehicle. As an example, to measure the RSS of a message, the processor may be configured to determine at least one of a power ratio in decibels of the message (dBm), a power spectral density of the message (dBm/MHz), and/or a bit error rate (BER) of the message.

At 412, the algorithm determines whether the RSS of the message is greater than a threshold RSS. The RSS threshold may be a value that corresponds to a signal strength of a message at a certain threshold distance from the vehicle (e.g., 50 meters). The RSS threshold may be predetermined based on empirical data obtained from an operator. Additionally or alternatively, the RSS threshold may be a dynamic value that is configured to constantly update based on traffic, road conditions, and/or the number of received messages per second. If the RSS of the message is greater than the RSS threshold, then the algorithm transfers to 416; otherwise, the algorithm transfers to 420. At 416, the algorithm submits the message for verification. Then, the algorithm transfers to 428.

At 420, in response to the determination that the RSS of the message is less than or equal to the RSS threshold, the security verification module may flag the message as unverified. At 422, the algorithm performs initial processing on the message. In other words, the received message is decoded and processed as a valid message. At 424, the algorithm determines whether VOD verification is desired for the message. As an example, VOD verification may be performed on messages that are critically important to the safety of the vehicle, such as messages indicating a driving hazard, accident, cooperative cruise control, and security certificate distribution messages. Additionally, messages that are not critically important to the safety of the vehicle, such as a message from an emergency vehicle traveling in the opposite direction of the vehicle, may not require VOD verification. If VOD verification is desired, the algorithm returns to 416; otherwise, the algorithm processes the message at 444 and then transfers to 448.

Returning to 428, the algorithm performs cryptographic verification of the message. At 432, the algorithm determines whether the message passes verification. If so, the algorithm transfers to 436; otherwise, in response to the message being, for example, corrupted or subject to malicious tampering, the message is discarded at 440, and then the algorithm transfers to 448.

Returning to 436, the message is flagged as verified and then transfers to 444. At 444, the algorithm performs final processing on the signal. At 444, the algorithm may perform further processing on the message or generate an output corresponding to the message, such as an alert, a control signal to a vehicle system, etc. The algorithm then transfers to 448. At 448, the algorithm determines whether there are additional messages that were received by the DSRC system. If so, the algorithm proceeds to 452 and the security verification module selects the next message that was received by the DSRC system. After selecting the next message, the algorithm returns to 408. If the algorithm determines there are not any additional messages that were received by the DSRC system at 448, the algorithm proceeds to 456 and ends.

With reference to FIG. 5, a flowchart 500 showing an example implementation of a method for cryptographically verifying an incoming message of a DSRC system is shown. The algorithm begins at 504 when, for example, the vehicle is turned on by the operator. At 506, the DSRC system receives DSRC radio messages from, for example, a remote vehicle or an infrastructure system, and the security verification module selects a first message.

At 508, the algorithm is configured to, using the processor, determine a message type of the selected message. In general, the DSRC system may be configured to receive messages having a variety of message types. As an example, the DSRC message may have a message type selected from a list including a basic safety message (BSM), a platooning message, a cooperative cruise control message, and a security certificate distribution message.

A BSM may include any suitable vehicle operating parameter information, such as GPS position data, speed, change in speed, acceleration, etc. The vehicle operating parameter information is measured relative to a position of the DSRC system of the host vehicle. As an example, the DSRC system may use a camera system, a sonar system, a Lidar system, an ultrasonic system, and/or a radar system to determine the vehicle operating parameter information. The host vehicle may also transmit or receive a BSM if some critical event occurs that requires immediate attention, such as an accident, a presence of an emergency vehicle nearby, a road hazard, etc.

Platooning messages may be related to vehicle platooning, which is defined as a method of increasing a capacity and efficiency of road transportation by grouping vehicles on a road and controlling the operations of the vehicle as a group. As an example, a platoon of vehicles may be configured to accelerate and/or brake simultaneously, thereby allowing for a closer headway between vehicles and eliminating a reacting distance needed for human reaction. Furthermore, vehicle platooning may provide greater fuel economy, reduced congestion, shorter commutes, and fewer traffic collisions.

Cooperative cruise control messages may be related to cooperative adaptive cruise control, which may be defined as using the host vehicle's speed, position, and acceleration along with a remote vehicle's speed, position, and acceleration in order to determine the speed of the host vehicle while operating in cruise control. Cooperative cruise control may provide greater fuel economy, reduced congestion, shorter commutes, and fewer traffic collisions.

Security certificate distribution messages may be defined as messages that assist in the prevention of adverse tampering and/or manipulation of V2X communications. As an alternative to sending a security certificate with each message, a vehicle may periodically transmit and receive security certificate distribution messages, which are configured to communicate the validity of messages being transmitted and received by the vehicle. As an example, the security certificate distribution message may include an authenticated time-stamp and geographic location of a remote vehicle's origin, a randomization of any identifiable property associated with either the host or remote vehicle, such as a pseudonym, MAC address, and any network/security protocol related states. Furthermore, the security certificate distribution message may be configured to remove any publicly known identifiers of a vehicle. Thus, security certificate distribution messages may prevent DOS, DDOS, Sybil, and/or node impersonation attacks of a network in which V2X communications occur. Furthermore, the security certificate distribution message may be configured to prevent application/forged message, timing, social, monitoring, and replay attacks of the V2X system.

At 512, the algorithm determines whether the message is a BSM. Alternatively, the algorithm may be configured to determine whether the message is platooning message, a cooperative cruise control message, or a security certificate distribution message. Any message type hierarchy may be implemented at step 512. Using the hierarchy described above, if the message is a BSM, the algorithm transfers to 516; otherwise, the algorithm transfers to 520. At 516, the algorithm submits the message for verification. Then, the algorithm transfers to 528.

At 520, in response to the algorithm's determination that the message type is not a BSM, the security verification module may flag the message as unverified. At 522, the algorithm performs initial processing on the message. In other words, the received message is decoded and processed as a valid message. At 524, the algorithm determines whether VOD verification is desired for the message. As an example, VOD verification may be performed on messages that are critically important to the safety of the vehicle, such as messages indicating a driving hazard, accident, cooperative cruise control, and any security certificate distribution messages. Additionally, messages that are not critically important to the safety of the vehicle, such as a message from an emergency vehicle traveling in the opposite direction of the vehicle, may not be require VOD verification. If VOD verification is desired, the algorithm returns to 516; otherwise, the algorithm performs final processing on the signal at 544. At 544, the algorithm may perform further processing on the message or generate an output corresponding to the message, such as an alert, a control signal to a vehicle system, etc. The algorithm then transfers to 548.

Returning to 528, the algorithm performs cryptographic verification on the message. At 532, the algorithm determines whether the message passes verification. If so, the algorithm transfers to 536; otherwise, in response to the message being, for example, corrupted or subject to malicious tampering, the message is discarded at 540, and the algorithm then transfers to 548.

Returning to 536, the message is flagged as verified and then transfers to 544. At 544, the algorithm processes the message and then proceeds to 548. At 548, the algorithm determines whether there are additional messages that were received by the DSRC system. If so, the algorithm proceeds to 552 and the security verification module selects the next message that was received by the DSRC system. After selecting the next message, the algorithm returns to 508. If the algorithm determines there are not any additional messages that were received by the DSRC system at 548, the algorithm proceeds to 556 and ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of cryptographic security verification comprising:
  receiving, using a dedicated short range communications system (DSRC), a message from at least one of a remote vehicle and an infrastructure system;

determining, using a processor configured to execute instructions stored on a nontransitory memory component, whether the message is a basic safety message (BSM) type;

performing, using the processor, verification of the message in response to determining that the message is the BSM type;

determining, using the processor, whether a current number of attempted message verifications per second is less than a predetermined threshold in response to determining that the message is not the BSM type, wherein the predetermined threshold is based on a maximum message frequency supported by the processor and a predetermined constant, and wherein the predetermined constant is configured to prevent the processor from overloading;

performing, using the processor, verification of the message in response to determining that the current number of attempted message verifications per second is less than the predetermined threshold;

determining, using the processor, whether the message is a second message type in response to the current number of attempted message verifications per second not being less than the predetermined threshold, the second message type being one of a platooning message type, a cooperative cruise control type, and a security distribution certificate message type;

performing, using the processor, verification of the message in response to the current number of attempted message verifications per second not being less than the predetermined threshold and the message being the second message type; and processing, using the processor, the message in response to the message being verified.

2. The method of claim 1 further comprising flagging the message as verified in response to a determination that the message has been verified by the processor.

3. The method of claim 1 further comprising discarding the message in response to the message not being verified by the processor as a result of at least one of a message corruption and a message tampering.

4. The method of claim 1 wherein the message indicates at least one of a driving hazard, an accident, a cooperative cruise control message, and a security certificate distribution message.

5. A method of cryptographic security verification comprising:

receiving, using a dedicated short range communications system (DSRC), a message from at least one of a remote vehicle and an infrastructure;

determining, using a processor that is configured to execute instructions stored on a nontransitory memory component, whether the message is a basic safety message (BSM) type;

performing, using the processor, verification of the message in response to determining that the message is the BSM type;

determining, using the processor, whether a current number of attempted message verifications per second is less than a predetermined threshold in response to determining that the message is not the BSM type, the predetermined threshold being based on a maximum message frequency supported by the processor and a predetermined constant, and the predetermined constant being configured to prevent the processor from overloading;

performing, using the processor, verification of the message in response to determining that the current number of attempted message verifications per second is less than the predetermined threshold;

determining, using the processor, whether the message is a second message type in response to the current number of attempted message verifications per second not being less than the predetermined threshold, wherein the second message type is one of a platooning message type, a cooperative cruise control type, and a security distribution certificate message type;

performing, using the processor, verification of the message in response to determining that the message is the second message type; and processing, using the processor, the message in response to the message being verified.

6. The method of claim 5 further comprising flagging the message as verified in response to a determination that the message has been verified by the processor.

7. The method of claim 5 further comprising discarding the message in response to a determination that the message was not verified by the processor as a result of at least one of a message corruption and a message tampering.

8. The method of claim 1, wherein the predetermined threshold is based on a maximum number of message verifications per second after being processed.

9. The method of claim 5, wherein verification of the message further comprises:

comparing, using the processor, a security certificate of the message to a list of security certificates; and determining, using the processor, whether the security certificate of the message matches a first security certificate of the list of security certificates.

10. The method of claim 5, wherein verification of the message further comprises:

comparing, using the processor, a digital signature of the message to a list of digital signatures; and determining, using the processor, whether the digital signature of the message matches a first digital signature of the list of digital signatures.

* * * * *